United States Patent
Kobayashi et al.

[11] Patent Number: 5,838,109
[45] Date of Patent: Nov. 17, 1998

[54] DISCHARGE LAMP LIGHTING DEVICE

[75] Inventors: Shoji Kobayashi; Akiyosi Ozaki, both of Shizuoka, Japan

[73] Assignee: Koito Manufacturing Co., Ltd., Tokyo, Japan

[21] Appl. No.: 744,930

[22] Filed: Nov. 6, 1996

[30] Foreign Application Priority Data

Nov. 6, 1995 [JP] Japan .................................. 7-309701

[51] Int. Cl.⁶ .............................. F21K 7/00; H05B 37/00
[52] U.S. Cl. ................................ 315/58; 315/82; 315/59; 362/265
[58] Field of Search .................................. 362/263, 265; 315/58, 307, 308, 82, 209 M, 59

[56] References Cited

U.S. PATENT DOCUMENTS

| | | | |
|---|---|---|---|
| 5,015,917 | 5/1991 | Nigg | 315/56 |
| 5,068,570 | 11/1991 | Oda et al. | 315/128 |
| 5,140,229 | 8/1992 | Yagi et al. | 315/307 |
| 5,142,203 | 8/1992 | Oda et al. | 315/308 |
| 5,151,631 | 9/1992 | Oda et al. | 315/127 |
| 5,212,428 | 5/1993 | Sasaki et al. | 315/224 |
| 5,278,452 | 1/1994 | Matsumoto et al. | 307/10.8 |
| 5,295,036 | 3/1994 | Yagi et al. | 361/79 |
| 5,386,348 | 1/1995 | O'Shaughnessey et al. | 362/61 |
| 5,422,548 | 6/1995 | Yamashita et al. | 315/308 |
| 5,434,763 | 7/1995 | Hege et al. | 362/265 |
| 5,449,973 | 9/1995 | Yamashita et al. | 315/82 |
| 5,485,059 | 1/1996 | Yamashita et al. | 315/307 |
| 5,486,740 | 1/1996 | Yamashita et al. | 315/308 |
| 5,497,298 | 3/1996 | Luallin et al. | 362/61 |
| 5,514,935 | 5/1996 | Oda et al. | 315/82 |
| 5,567,033 | 10/1996 | Tanaka et al. | 362/61 |

FOREIGN PATENT DOCUMENTS 0 692670  7/1995  European Pat. Off.

Primary Examiner—Benny Lee
Assistant Examiner—David H. Vu
Attorney, Agent, or Firm—Sughrue, Mion, Zinn, Macpeak & Seas, PLLC

[57] ABSTRACT

A discharge lamp lighting device in which the effects of heat generated by a discharge lamp on a noise filter circuit are reduced and a sufficient installation space for the noise filter circuit is provided. The discharge lamp lighting device includes a starter circuit which generates a start signal for a discharge lamp and applies the start signal to the discharge lamp, and a noise filter circuit which is interposed between the starter circuit and discharge lamp. The noise filter circuit is disposed in a mounting member for mounting the starter circuit, or otherwise the noise filter circuit can disposed in a mounting member for mounting therein a transformer which is included in the starter circuit and is used to generate a start signal for the discharge lamp.

12 Claims, 5 Drawing Sheets under and for the noise filter circuit.

DISCHARGE LAMP LIGHTING DEVICE

BACKGROUND OF THE INVENTION

The present invention relates to a discharge lamp type lighting device including a filter circuit provided for reducing electromagnetic noise.

Discharge lamps, such as metal halide lamps or the like, have recently been used as a light source for vehicular lamps. A lighting circuit for operating such a discharge lamp includes a circuit (namely, a so-called ballast circuit) used to control the lighting of the discharge lamp, and a starter circuit which applies a starting signal to the discharge lamp.

However, when a discharge lamp is used in a vehicular lamp, electromagnetic noise is generated, making it necessary to provide measures to reduce the effects of electromagnetic interference of the discharge lamp on peripheral circuits and other electrical and electronic devices.

This electromagnetic noise arises from several sources, one of which is the so-called "arc restriking noise" which is produced upon the reversal of the polarity of the current flowing through the discharge lamp. Such noise can be radiated from a high-voltage line which connects the discharge lamp with the starter circuit. To reduce such noise, for example, there is a known method in which the starter circuit and high-voltage line are both covered with shield members to thereby confine the noise. For example, the shield members may be attached to the rear end portion of the lamp body of the lighting device, and the starter circuit and high-voltage line may be disposed within the shield members.

However, to apply this method of noise control there must be sufficient space available to attach the shield members to the rear end portion of the lamp body. If such space is not available, another method can be used in which a noise filter is interposed between the discharge lamp and the starter circuit.

For example, if a low-pass filter composed of an inductor and a capacitor is interposed between the discharge lamp and starter circuit, then it is possible to cut noise having a frequency higher than the cutoff frequency of the filter circuit.

With respect to the manner of attachment of the noise filter circuit, as shown in FIG. 6, when a noise filter circuit c is interposed between a starter circuit a and a discharge lamp b, it is necessary to provide a mounting member d for mounting the noise filter circuit c therein. On the other hand, as shown in FIG. 7, when a socket e for mounting a discharge lamp b is interposed between the starter circuit a and the discharge lamp b, the noise filter circuit c may be disposed within the socket e, which eliminates the need for providing a separate mounting member for mounting the noise filter circuit c therein.

However, in the structure shown in FIG. 7, since the noise filter circuit c is disposed near the discharge lamp b, there arises a problem that the components of the noise filter circuit c are required to have high heat resistance because a discharge lamp generates significant amounts of heat. Also, if the components are large, they cannot all be mounted within an ordinary sized socket e, which raises another problem that the size of the socket e must be increased, which again requires a large amount of space.

For example, when the discharge lamp b is connected to the socket e and the high-voltage line is used to connect the socket e with the starter circuit a, in order to mount the noise filter circuit c in the socket e, it is necessary to provide space for mounting the various components (such as an inductor, a capacitor and the like) of the noise filter circuit c on a substrate, which has adverse effects on the socket e, for example, the size of the socket e must be increased.

SUMMARY OF THE INVENTION

In view of the above, it is an object of the invention to provide a discharge lamp lighting device in which the effects of the heat generated by a discharge lamp on a noise filter circuit are reduced, and sufficient installation space is provided for the noise filter circuit.

In attaining the above object, according to the invention, there is provided a discharge lamp lighting device in which a noise filter circuit is disposed within the same mounting member in which a starter circuit is mounted.

According to the invention, since the position of the mounting member for the starter circuit can be selected freely compared with a socket for a discharge lamp, the noise filter circuit can be disposed at a position spaced apart from the discharge lamp so that the noise filter circuit is free from the effects of the heat generated by the discharge lamp. Also, the noise filter circuit is mounted in the mounting member for the starter circuit without the need for providing any special mounting member for the noise filter circuit, thus making it possible to obtain sufficient installation space for the noise filter circuit.

DESCRIPTION OF THE PREFERRED EMBODIMENTS

A description will be given below of preferred embodiments of a discharge lamp type lighting device constructed according to the invention.

Figure 1:
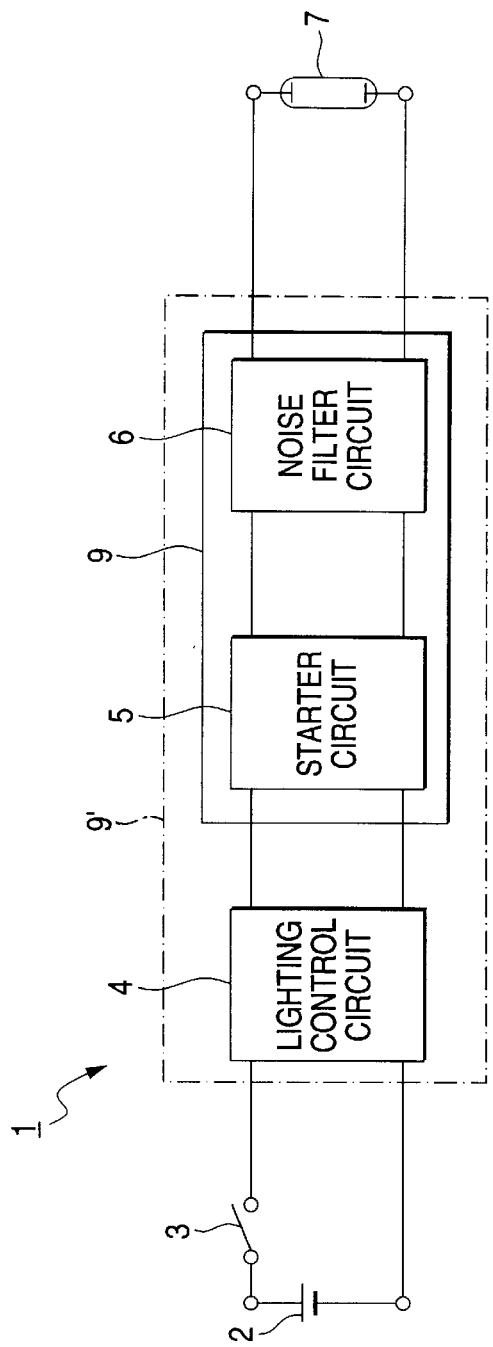
FIG. 1 is a circuit block diagram showing the general structure of a discharge lamp lighting device constructed according to the invention.

FIG. 1 shows a schematic circuit block diagram of the overall structure of a lighting device 1 for a discharge lamp, in which a dc supply voltage from a dc supply source 2 is applied through a lighting switch 3 to a lighting control circuit 4, where the dc supply voltage is converted to an ac voltage. The ac voltage is then supplied through a starter circuit 5 and a noise filter circuit 6 to a discharge lamp 7.

When the discharge lamp 7 is activated, the starter circuit 5 generates a high voltage start pulse, which is superimposed on an ac voltage (such as a square-wave voltage, a sinusoidal voltage or the like) to be output from the lighting control circuit 4. The thus superimposed start pulse and ac voltage are then applied to the discharge lamp 7.

The noise filter circuit 6 may have any structure, provided that it has the characteristic of a low-pass filter having a desired cutoff frequency. For example, in FIG. 2, there is shown a simple noise filter structure composed of two high-voltage lines 8 and 8' for connecting the respective output terminals of the starter circuit 5 with the discharge lamp 7, two inductors L and L' respectively disposed on the high-voltage lines 8 and 8', and a capacitor C interposed between the high-voltage lines 8 and 8' for connecting the terminals of the inductors L and L' on the discharge lamp 7 thereof with each other.

The noise filter circuit 6, in accordance with the present invention, is mounted in a mounting member 9 for mounting the starter circuit 5 therein. With this structure, the heat generated by the discharge lamp 7 affects the noise filter circuit 6 less than the case in which the noise filter circuit 6 is disposed in the socket for the discharge lamp 7. Due to the reduced heat effect, it is not necessary to increase the heat resistance of the components of the noise filter circuit 6 as required in conventional devices. This results in a reduction in the cost of the noise filter circuit 6, while the range of selection of the components thereof is broadened.

Also, the components of the noise filter circuit 6 can be arranged collectively on the substrate of the starter circuit 5, which facilitates production of the lighting device. Further, because relatively large-size elements can be used for the components of the noise filter circuit 6 and the selection range of the components thereof is widened, the cutoff frequency of the noise filter circuit 6 can be set freely. In addition, as the mounting member 9 is formed of a conductive material such as metal or the like, external noise is cut off. As shown by a chained line in FIG. 1, the inventive lighting device 1 may also be structured such that the noise filter circuit 6 is mounted within a mounting member 9' for mounting the lighting control circuit 4 and starter circuit 5 therein.

If the starter circuit 5 includes a transformer for generating a start pulse and another mounting member for the transformer is further disposed within the mounting member 9, and the noise filter circuit 6 is disposed within the mounting member which contains the transformer, the lighting device 1 can handle high voltages superiorly while achieving a more compact size.

Figure 3:
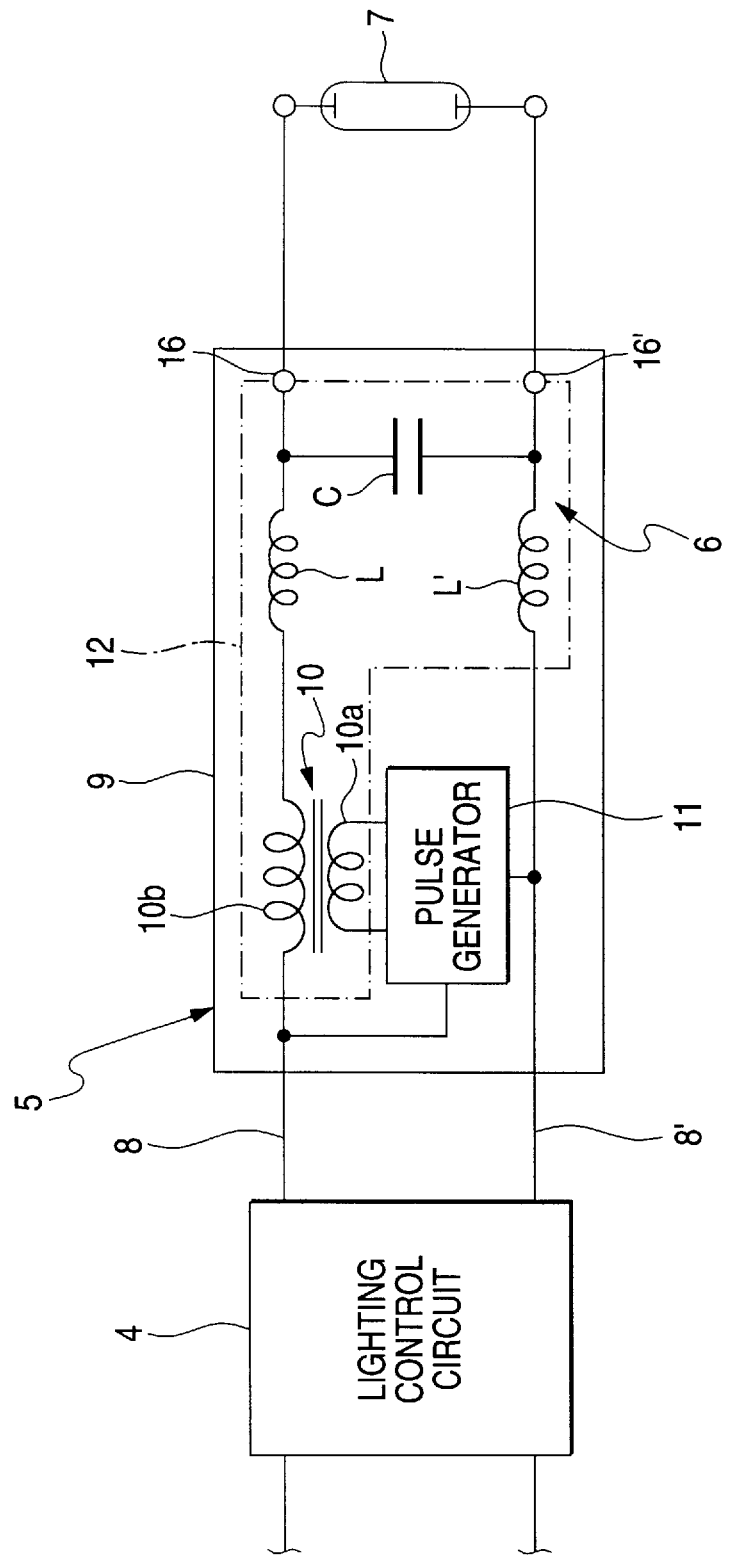
FIG. 3 is a circuit block diagram of main portions of a noise filter circuit according to the invention disposed within a mounting member for mounting a transformer therein.

FIG. 3 shows another embodiment of a discharge lamp lighting device constructed according to the invention, in which the starter circuit 5 includes a trigger transformer 10 for generating a start pulse and a pulse generator 11.

A secondary winding 10b of the trigger transformer 10 is provided in the high-voltage line 8. One end of a primary winding 10a thereof and one end of the secondary winding 10b are connected to one of the output terminals of the lighting control circuit 4. The output of the pulse generator 11 is thus supplied to the primary winding 10a when the discharge lamp 7 is activated, so that the output is boosted, extracted by the secondary winding 10b, and superimposed on the output of the lighting control circuit 4. The thus superimposed output is supplied to the discharge lamp 7.

The inductors L and L' of the noise filter circuit 6, which are arranged in the rear stage of the trigger transformer 10, are respectively provided in the high-voltage lines 8 and 8', while a capacitor C is interposed across the terminals of the discharge lamp 7.

Therefore, as shown by a chained line in FIG. 3, if not only the components of the noise filter circuit 6 are mounted in a mounting member 12 which contains the trigger transformer 10, but also the mounting member 12 and the pulse generator part 11 are both mounted within the mounting member 9 for the starter circuit 5, then a dual shielded structure can be realized, which makes it possible to even more effectively shield electromagnetic noise. Also, when compared with a structure in which the noise filter circuit is mounted in the socket for the discharge lamp, or compared with a structure in which the noise filter circuit is disposed within a mounting member different from the mounting member 9 for mounting the starter circuit 5, the number of connecting terminals for the high-voltage outputs in the present invention can be reduced, which in turn reduces the number of measures which must be taken to handle high voltages (for example, formation of slits, provision of adequate insulation distances and the like), thereby allowing a decrease in the size of the discharge lamp lighting device.

In the above-described noise filter circuit 6, the components thereof (such as inductors, capacitors and the like) can be implemented as separate components. However, in the case of the capacitor C, separate element parts are not required, but if the capacitor is formed of connecting terminals and a box member and/or resin material filled in the box member, then it can be freely designed in shape, size and other characteristics (such as electrostatic capacity and the like) thereof with no restriction on its mounting space.

In other words, since the capacitor C is structured in such a manner that a dielectric is held by and between two electrodes, if there can be realized a structure wherein the peripheral support members of the electrodes are formed of insulating material or resin material is filled in such support members, then a capacitor, which acts as a capacitive load, can be formed without using elemental parts.

Figure 4:
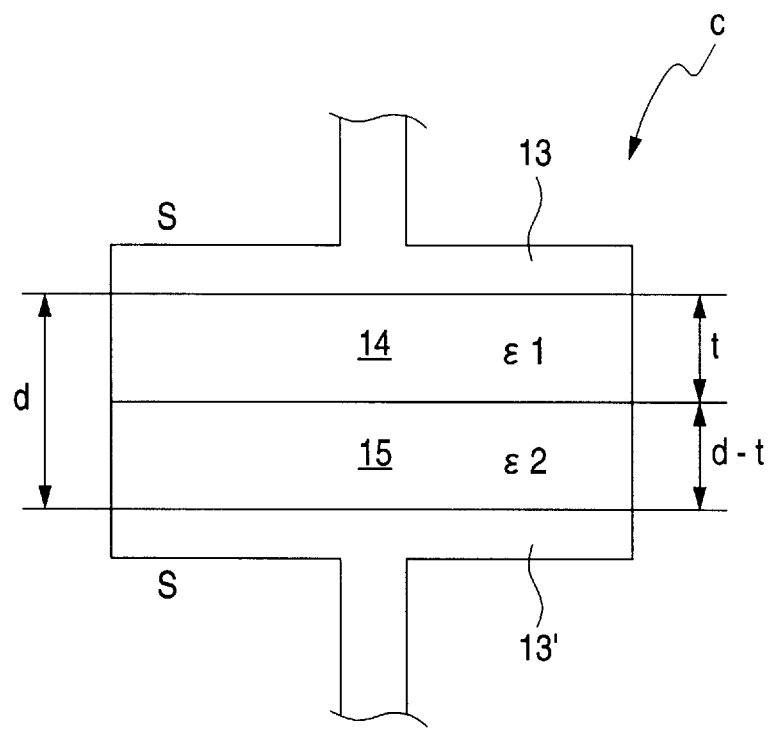
FIG. 4 is an explanatory view of the basic structure of a capacitor.

For example, with respect to the basic structure of the capacitor C shown in FIG. 4, if an insulator 14 and resin 15 are interposed between two electrodes 13 and 13', and if the inter-electrode distance is expressed as d, the electrode area is expressed as S, the thickness and dielectric constant of the insulator 14 are respectively expressed as t and $\in_1$, and the thickness and dielectric constant of the insulator 14 are respectively expressed as d−t and $\in_2$, the electrostatic capacity C of the capacitor can be found according to the parallel circuit rule, that is: $1/C = t/(\in_1 \cdot S) + (d-t)/(\in_2 \cdot S)$. However, if only the insulator 14 is disposed between the two electrodes 13 and 13', when t=d, then there is obtained $C = \in_1 \cdot S/d$. In this case, in the basic structure of the capacitor only one kind of insulator is interposed between two electrodes.

Accordingly, if the material and thickness of the insulator and/or resin as well as the shape of electrodes are specified properly, then it is possible to obtain a capacitor which has a desired electrostatic capacity.

Figure 2:
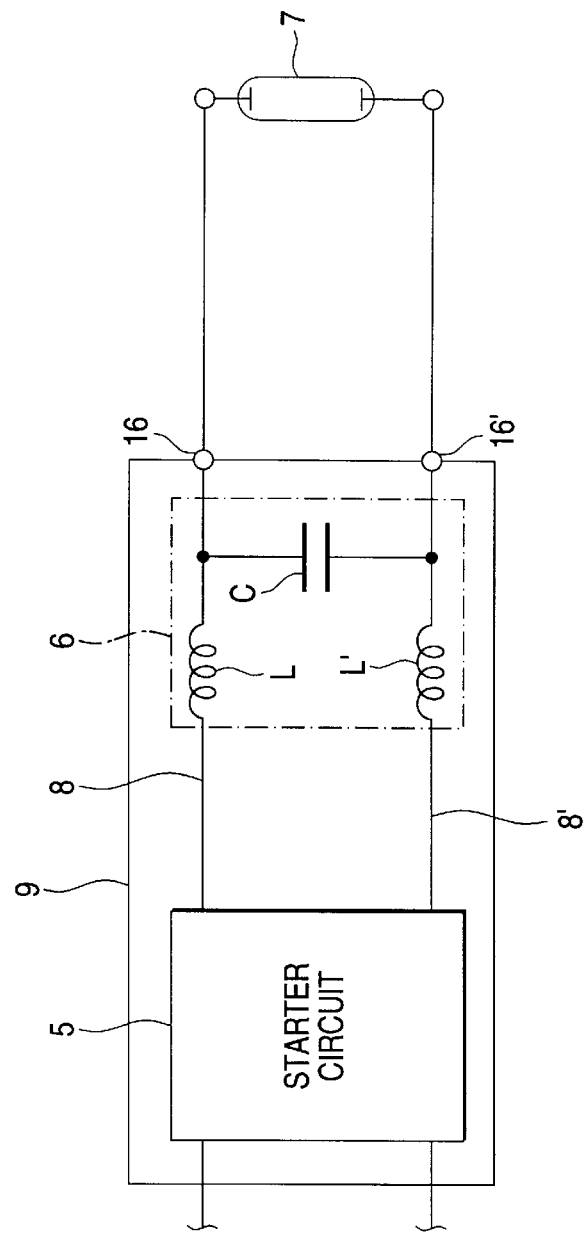
FIG. 2 is a circuit block diagram of main portions of a discharge lamp lighting device according to the invention.

For example, in the structure shown in FIG. 2, the output terminals 16 and 16' of the noise filter circuit 6 may be used as the electrodes thereof because a capacitor is formed between the output terminals. Specifically, the mounting member 9 for the starter circuit 5 or the support member for the output terminals 16 and 16' are fixed to the mounting member 9 and may be formed of insulating material, and resin may be embedded between the output terminals 16 and 16', so that the supporting member and resin serve as the capacitor C. Otherwise, in the structure shown in FIG. 3, the output terminals 16 and 16' of the noise filter circuit 6 may be used as the electrodes thereof, the mounting member 9 for mounting the trigger transformer 10 or the support member for supporting the output terminals 16 and 16' fixed to the mounting member 9 may be formed of insulating material, and resin may be filled between the output terminals 16 and 16', thereby forming the capacitor C.

To provide the resin in the mounting member, the following methods can be employed:

(1) A method for forming resin by molding.

For example, by molding a recessed portion or a space within the mounting member and filling the space with resin material, the resin material can be interposed between the connecting terminals of the noise filter circuit.

For the resin material itself, epoxy resin, phenol resin, polyurethane resin, silicon resin and the like can be employed.

(2) A method for providing resin by insert formation.

In this method, when the mounting member is formed of insulating material, the connecting terminals and lines are embedded in the mounting member by insert formation. When compared with the above-mentioned molding method, the capacitor can be formed more easily.

For the resin material, epoxy resin, phenol resin, polyurethane resin, polyallylate resin, melamine resin, nylon (polyamide), PET, PBT, PPS, polyether imide, various kinds of liquid crystal polymers, and the like can be used.

If a resin portion of a different material from that of the mounting member is desired, a so called two-color forming method can be used.

Also, as to the selection of the material, the material may be determined in accordance with the desired cutoff frequency of the noise filter circuit. For example, if the lighting frequency of the lighting circuit is set in the range of 400 to 500 Hz, the typical value of the frequency of the start pulse is set on the order of 2 MHz, and the cutoff frequency of the noise filter circuit is set on the order of 10 MHz or higher.

If the noise filter circuit is composed of a low-pass filter circuit of the LC type, expressing the cutoff frequency as f, the inductance of the inductor as L, and the electrostatic capacity of the capacitor as C, and if the value of f and L are determined according to the equation $f=1/(2\pi\sqrt{LC})$, then the value of C can be determined. For example, if $2.2 \mu H \leq L \leq 10 \mu H$ and $f \leq 10$ MHz, then there is obtained: $25 pF \leq C \leq 115$ pF.

In the equation relating the electrostatic capacity C, dielectric constant $\in$, inter-electrode distance d, and electrode area S, as described above, the dielectric constant (more specifically, the relative dielectric constant) can be determined according to the value of C based on the cutoff frequency f, or according to the value of S or d, which can be specified by the shapes of the mounting members 9, 9'. An appropriate resin material can be selected accordingly.

Figure 5:
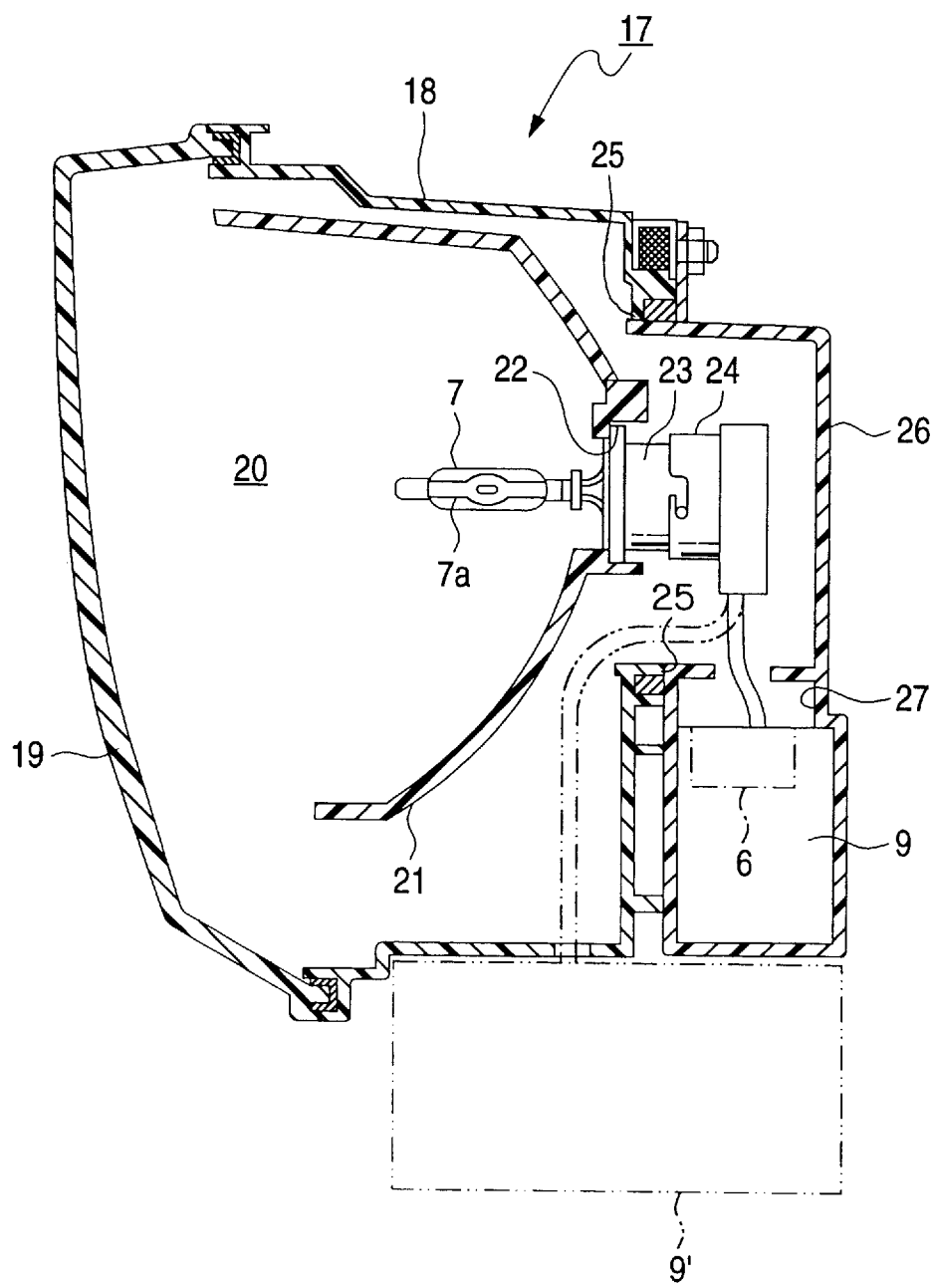
FIG. 5 is a longitudinal section view of an embodiment of a vehicular lamp device utilizing a discharge lamp lighting device according to the invention.
Figure 6:
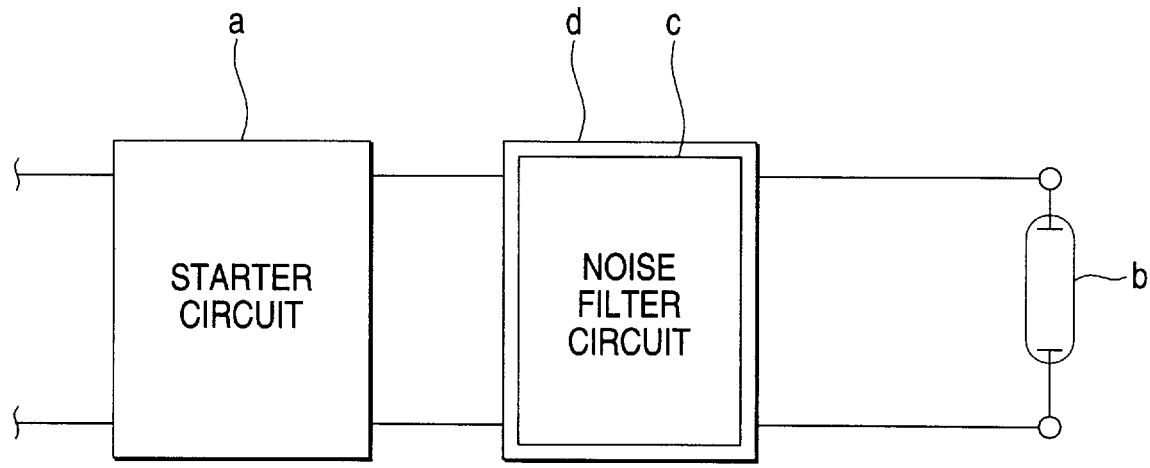
FIG. 6 is a circuit block diagram of a conventional discharge lamp lighting device in which a noise filter circuit is interposed between a discharge lamp and a starter circuit.
Figure 7:
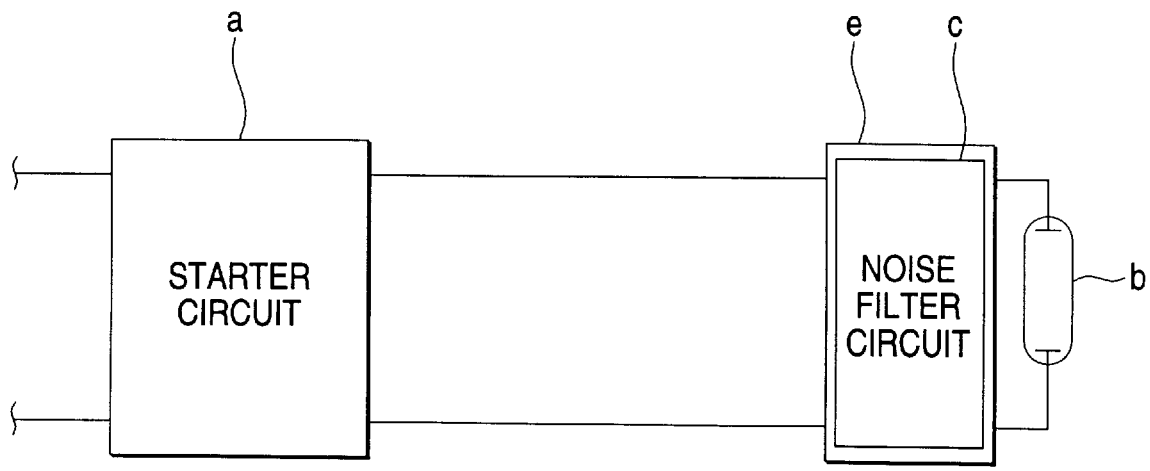
FIG. 7 is a circuit block diagram of another conventional discharge lamp lighting device in which a noise filter circuit is disposed within a socket for a discharge lamp.

FIG. 5 shows a longitudinal section view of an embodiment of a vehicular lamp device to which a discharge lamp lighting device according to the invention is applied.

The vehicular lamp device 17 includes a lamp body 18 which opens forwardly (the radiation direction of the lamp device is assumed to be the forward direction herein) and which is formed of synthetic resin. A front surface lens 19 covers the opening formed in the lamp body 18, while the lamp body 18 and front surface lens 19 cooperate together in defining a lamp space 20. A reflector 21 is disposed in the thus-defined lamp space 20. The reflector 21 is mounted on the lamp body 18 by a suitable mounting structure (not shown).

An insertion hole 22 is formed in the reflector 21, into which the discharge lamp 7 can be inserted. After the connecting end portion 23 of the discharge lamp 7 is fitted into a socket 24, the lamp bulb 7a of the discharge lamp 7 is inserted in the forward direction into the insertion hole 22, and then the discharge lamp 7 is mounted on the reflector 21 by an appropriate proper mounting structure such as a set spring or the like provided in the reflector 21. Thus, the discharge lamp 7 can be positioned in such a manner that the central axis of the lamp bulb 7a extends along the main optical axis of the reflector 21.

The lamp body 18 further includes in the rear surface thereof an opening 25 which faces rearwardly. Also, the vehicular lamp device 17 includes a cover member 26 which can be removably mounted onto the rear surface of the lamp body 18 in such a manner that it covers the opening 25 of the lamp body 18. Therefore, when connecting the discharge lamp 7 to the socket 24 or replacing the discharge lamp 7, with the cover member 26 removed from the rear surface of the lamp body 18, the discharge lamp 7 can be inserted into the lamp space 20 through the opening 25. Further, the cover member 26, which is formed of a conductive material such as a metal or the like, also includes a recessed portion 27 which is used to receive a mounting member 9 for mounting the starter circuit 5 and noise filter circuit 6 therein.

While the mounting member 9 is being mounted in the recessed portion 27 as shown in FIG. 5, the mounting member 9 is mounted on the rear surface of the lamp body 18 together with the cover member 26, and the noise filter circuit 6 and discharge lamp 7 are connected with each other by a high-voltage line extending from the mounting member 9.

As described above, since the cover member 26 is formed of a conductive material and since the mounting member 9 is mounted within the conductive cover member 26 and the noise filter circuit 6 is thereby enclosed in a shielded manner, radiation of electromagnetic noise is prevented, the mounting member 9 can be mounted on the lamp body 18 simply, and the length of the high-voltage line for connecting the discharge lamp 7 with the starter circuit 5 and noise filter circuit 6 can be shortened.

Also, if the noise filter circuit 6 is mounted within a mounting member 9' (see the single-dot chained line in FIG. 1) for mounting the lighting control circuit 4 and starter circuit 5, as shown by a two-dot chained line in FIG. 5, the mounting member 9' may be additionally installed in the vicinity of the lamp body 18.

As can be understood from the foregoing description, according to the invention, by disposing the noise filter within the mounting member for mounting the starter circuit therein, the noise filter circuit can be positioned apart from the discharge lamp, and by mounting the noise filter circuit within the mounting member for the starter circuit, a sufficient installation space for the noise filter circuit can be secured.

Further according to the invention, since the starter circuit includes a transformer for generating a start signal to be applied to the discharge lamp and the noise filter circuit is disposed within the mounting member for mounting the transformer therein, the number of high-voltage connecting portions can be reduced, which results in a compact discharge lamp lighting device.

What is claimed is:

1. A discharge lamp lighting device comprising:
 a starter circuit for generating a starting signal for a discharge lamp and applying the starting signal to said discharge lamp, a mounting member, and a noise filter circuit interposed between the starter circuit and the discharge lamp, said starter circuit and said noise filter circuit being directly secured to said mounting member.

2. A discharge lamp lighting device as set forth in claim 1, wherein said starter circuit comprises a transformer disposed within said mounting member.

3. A discharge lighting device as set forth in claim 2, wherein said mounting member is formed of a conductive material substantially enclosing said transformer and said noise filter circuit.

4. A discharge lighting device as set forth in claim 1, wherein said mounting member is formed of a conductive material substantially enclosing said starter circuit and said noise filter circuit 5. A discharge lighting device as set forth in claim 1, wherein said noise filter circuit comprises a pair of high voltage lines for applying said starting signal to said discharge lamp, and wherein said noise filter circuit comprises a pair of inductors having first terminals coupled to respective ones of said high voltage lines and a capacitor coupled between second terminals of said inductors.

6. A discharge lighting device as set forth in claim 5, wherein said starter circuit comprises a trigger transformer having a primary winding and a secondary winding, said secondary winding is provided in said high-voltage line and one end of said primary winding and one end of said secondary winding are connected to one of output terminals of a lighting control circuit mounted in said mounting member, an output of a pulse generator of said starter circuit is supplied to said primary winding when the discharge lamp is activated, so that the output is boosted, extracted by said secondary winding, and superimposed on the output of said lighting control circuit, and then the superimposed output is supplied to the discharge lamp.

7. A discharge lighting device as set forth in claim 6, wherein the components of said noise filter circuit are mounted in a second mounting member which contains said trigger transformer, and said second mounting member and said pulse generator are both mounted within said mounting member for said starter circuit.

8. The discharge lighting device according to claim 1, wherein said noise filter circuit is positioned on said mounting member to be spaced away from the discharge lamp so that heat generated from the discharge lamp has less effect on said noise filter circuit than if said noise filter circuit were disposed closer to the discharge lamp.

9. The discharge lighting device according to claim 1, further comprising a housing, said mounting member being a separate member from said housing.

10. A discharge lighting device according to claim 1 wherein said discharge lamp is a vehicular discharge lamp.

11. A discharge lighting device according to claim 10, wherein said vehicular discharge lamp is a metal halide lamp.

12. A discharge lighting device, comprising:
   a housing having an opening, said housing containing a discharge lamp;
   a cover for covering the opening of said housing and allowing the insertion of the discharge lamp into said housing;
   a mounting member having a recessed portion; and
   a starter circuit and a noise filter circuit secured in said recessed portion of said mounting member.

* * * * *